US008335319B2

(12) United States Patent
Rahbar (10) Patent No.: US 8,335,319 B2
(45) Date of Patent: Dec. 18, 2012

(54) DOUBLE TALK DETECTION METHOD BASED ON SPECTRAL ACOUSTIC PROPERTIES

(75) Inventor: Kamran Rahbar, Ottawa (CA)

(73) Assignee: Microsemi Semiconductor ULC, Kanata, ON (CA)

( * ) Notice: Subject to any disclaimer, the term of this patent is extended or adjusted under 35 U.S.C. 154(b) by 1258 days.

(21) Appl. No.: 12/117,779

(22) Filed: May 9, 2008

(65) Prior Publication Data
US 2008/0298601 A1 Dec. 4, 2008

Related U.S. Application Data

(60) Provisional application No. 60/941,188, filed on May 31, 2007.

(51) Int. Cl.
H04B 3/20 (2006.01)
H04B 15/00 (2006.01)
H04M 9/08 (2006.01)
(52) U.S. Cl. ............... 381/66; 379/406.14; 384/94.3
(58) Field of Classification Search ............... 381/66, 381/93, 94.1, 94.3; 379/406.01–406.16
See application file for complete search history.

(56) References Cited

U.S. PATENT DOCUMENTS

| | | | |
|---|---|---|---|
| 5,933,495 A * | 8/1999 | Oh ......................... 379/406.08 |
| 6,049,606 A | 4/2000 | Ding et al. |
| 6,272,106 B1 * | 8/2001 | Kawahara et al. ........... 370/201 |
| 6,442,275 B1 | 8/2002 | Diethorn |
| 6,522,747 B1 | 2/2003 | Reilly et al. |
| 6,580,795 B1 | 6/2003 | Li et al. |
| 6,804,203 B1 * | 10/2004 | Benyassine et al. .......... 370/286 |
| 2004/0037417 A1 * | 2/2004 | Seibert ...................... 379/406.01 |
| 2004/0234067 A1 | 11/2004 | Allen et al. |
| 2004/0234069 A1 | 11/2004 | Mikesell et al. |
| 2007/0028799 A1 | 2/2007 | Kniess et al. |

(Continued)

FOREIGN PATENT DOCUMENTS

GB 2344036 A 5/2000

(Continued)

OTHER PUBLICATIONS

T. Gansler, M. Hansson, C.J. Ivarsson, G. Salomonsson: "A double-talk detector based on coherence", IEEE Trans. on Communciation, No. 11, 2006, pp. 1421-1427.

(Continued)

*Primary Examiner* — Matthew Landau
*Assistant Examiner* — Khaja Ahmad
(74) *Attorney, Agent, or Firm* — Marks & Clerk (57) ABSTRACT

A method of detecting double talk condition in hands free communication devices is disclosed. In general, the method in accordance with the teachings of this invention detects double talk conditions based on inherent frequency response differences between the transducers used and acoustical effect on the spectrum of the returned echo signal. An input signal from a far-end talker and an input signal from the output from an echo canceler are received by the detector. K spectral subbands are created for each input signal. From this K subbands q subbands are selected based on inherent frequency differences between the far-end transducer and a near-end transducer. The spectral echo residual power is estimated at each subband. The estimated spectral echo power and the output signal from the echo canceler for a selected subband are compared to a predetermined threshold. Based on this comparison, it is determined whether double talk conditions exist based on the comparison.

22 Claims, 4 Drawing Sheets

Spectral domain double talk detector block diagram

U.S. PATENT DOCUMENTS

2007/0058798 A1* 3/2007 Takada .................. 379/406.01
2007/0058799 A1  3/2007 Sudo
2007/0189547 A1  8/2007 Hsu et al.
2009/0257579 A1* 10/2009 Takada .................. 379/406.08

FOREIGN PATENT DOCUMENTS

| | | | |
|---|---|---|---|
| GB | 2379369 A | | 3/2003 |
| JP | 07303072 A | | 11/1995 |
| JP | 2007174343 A | * | 7/2007 |
| WO | 2007062287 A2 | | 5/2007 |

OTHER PUBLICATIONS

Search Report from GB 0717907.0 dated Jan. 19, 2008.

* cited by examiner

FIGURE 1. Application example for double talk detector

FIGURE 2. Spectral domain double talk detector block diagram

FIGURE 3. Noise Estimation Circuit

FIGURE 4. Echo Residual Power Estimator

FIGURE 5. Detection Circuit

FIGURE 6 Frequency response between speaker and microphone in a hands free device

DOUBLE TALK DETECTION METHOD BASED ON SPECTRAL ACOUSTIC PROPERTIES

CROSS-REFERENCE TO RELATED APPLICATION

This application claims the benefit of U.S. Provisional Application No. 60/941,188 filed May 31, 2007 and GB 0717907.0 filed Sep. 14, 2007, both of which are incorporated by reference herein.

FIELD OF THE INVENTION

The present invention relates to hands-free telephony communications. More specifically, the present invention relates to a method for detecting double talk conditions in hands free telephony systems.

BACKGROUND OF THE INVENTION

Acoustic echo, which is the direct result of acoustic coupling between the microphone and speaker is the main source of distortion in hands free telephony systems.

To eliminate the echo while maintaining a full duplex communication, most echo cancelers use an adaptive filter to identify the acoustic path between the microphone and speaker and based on this identified path an estimate of the acoustic echo is subtracted from the microphone signal. Note that due to limited DSP engine resources (memory and MIPS) the size of adaptive filter is usually smaller than the actual size of the acoustic echo path and an exact estimate of acoustic echo cannot be made. Also in real environments, due to noise, non-linearity in echo path etc, the performance of linear adaptive echo canceler will be even more limited. As a result of all these effects linear adaptive echo cancelers cannot cancel echo completely and there always be some remaining echo residual that can be heard by the far-end listener.

To improve upon this limitation, a common approach is to use a non-linear process (NLP) at the output of the adaptive filter to further suppress any remaining echo residual. Since NLP can also suppress the near-end talker's voice, ideally NLP should be active only when far-end talker is active. During double talk periods, when both near-end and far-end talkers are speaking at same time, NLP should be turned off to prevent clipping the near end talker's voice. Also during double talk periods, adaptation of the adaptive filter needs to be frozen to prevent it from diverging.

Because of all above double talk detectors play an important role in acoustic echo cancelers. Ideally a double detector should only detect the condition when both near-end and far-end input signals are present at same time. In practice, under certain conditions, double talk detector may miss a double talk condition or may falsely detect a non-double talk situation (for example when only far-end signal is present). Note that false double detection prevents NLP to activate and adaptive filter to track any path changes. Both of these will result in noticeable increase in echo residual.

Most common double talk detection schemes rely on power differences or correlations between near-end and far-end signals to detect a double talk condition. Most of these methods also assume that near-end signal has higher power than the returned echo. Although this may be true for some applications but when microphone and speaker are acoustically highly coupled, and for high speaker volume the returned echo level can be much higher than the near-end signal. Under these conditions most double talk detector will either fail to detect the double talk or falsely detect it.

Some prior inventions try to resolve this problem in frequency domain by detecting signal energy in upper band spectrum of near end input. Main disadvantage of these methods is that its performance relies on the spectrum of the near end speech signal and it can fail if there is no signal energy in higher frequency bands which can happen for certain speech signals.

SUMMARY OF THE INVENTION

A method of detecting double talk condition in hands free communication devices is disclosed. In general, the method in accordance with the teachings of this invention detects double talk conditions based on inherent frequency response differences between the transducers used and acoustical effect on the spectrum of the returned echo signal.

The method in accordance with the teachings of this invention can be used to improve the full duplex performance of any acoustic echo canceler which employs a double talk detector to prevent distortion or clipping of the near-end signal. One advantage of the present invention is robust detection independent of level of returned echo or correlation between the near-end and far-end signals. Double talk can be detected even when echo level is higher than near-end signal level. The proposed scheme has also low computational complexity and it can be used stand alone or integrated with some of existing frequency domain echo cancellation methods.

Embodiments of the current invention in accordance with the teachings of this invention do not use upper band energy signals to detect double talk. Rather, the echo residual in selected sub bands are measured (which can be anywhere in signal spectrum and are selected automatically based on spectral differences in transducers ) to detect double talk. By doing so current approach will have a more robust double talk performance regardless of the spectrum of near end speech signal.

Thus, according to one aspect, the invention provides a double talk detector wherein the double talk detection is based on inherent frequency differences between transducers in a hands free communication system and acoustical effect on the spectrum of the returned echo signal.

In one aspect, the invention provides a method of detecting double talk conditions in a hands free communication system. The method comprises receiving an input signal from a far-end transducer and an input signal from the output from an echo canceler; converting the input signals to a frequency domain using N-point FFT blocks; creating K spectral sub-bands from output of FFT blocks; selecting q spectral subbands for each converted input signal based on inherent frequency differences between the far-end transducer and a near-end transducer; and determining whether double talk conditions exist based on a comparison of the estimated echo power from far-end transducer to average power output of echo canceler for selected q subbands.

The step of determining double talk comprises estimating the spectral echo power for selected subbands for the input signal from the far-end transducer; estimating average power output for selected subband for the input signal from the output of the echo canceler; and comparing the spectral echo power and the average power output to a predetermined threshold. The method may further comprising the step of estimating the echo loss coefficients (ELC) for each spectral subband, wherein the spectral echo power at each subband is estimated based on the estimated ELCs. The ELCs may be estimated using a recursive method. In one embodiment, K may be less than N. The method may further comprise the step of estimating average power output of each subband prior to the step of estimating the ELCs. The step of estimating average power output of each subband may be done using a recursive method.

The method may also comprise the step of estimating average noise power for the input signal from the output from the echo canceler in each subband prior to the comparing step. The step of estimating average noise power for the input signal from the output from the echo canceler in each subband may be done using a recursive method. The method may also comprise the step of calculating an average estimate of background noise and subtracting this from the input signal from the output from the echo canceler to reduce sensitivity.

The method may further comprise the step of automatically finding subbands where echo power is less than a near-end signal power.

In one aspect, the invention also provides a method of detecting double talk conditions in a hands free communication system. The method comprises detecting inherent frequency differences between a far-end transducer and a near-end transducer in a hands free communication system; and detecting acoustical effect on the spectrum of the returned echo signal; and comparing the inherent frequency differences and acoustical effect to detect double talk conditions.

In another aspect, the invention provides a double talk detector, comprising: a circuit to detect inherent frequency differences between a far-end transducer and a near-end transducer in a hands free communication system; a circuit to detect acoustical effect on the spectrum of the returned echo signal; and a circuit to compare the inherent frequency differences and acoustical effect to detect double talk conditions.

The detector may also comprise an input for receiving an input signal from a far-end transducer and an input signal from the output from an echo canceler; a FFT filter for converting the input signals to a frequency domain using N-point complex FFT blocks; a sub bander unit for creating K spectral subbands for each input signal; a circuit for selecting q subbands based on inherent spectral acoustic differences between the far-end transducer and a near-end transducer; an estimator for estimating the spectral echo power for selected subbands for the input signal from the far-end transducer; an estimator for estimating average power output for selected subbands for the input signal from the output of the echo canceler; a comparator for comparing the spectral echo power and the average power output to a predetermined threshold; and a circuit for determining whether double talk conditions exist based on the comparison.

In one embodiment, the circuit for estimating the spectral echo residual power at each subband may comprise a circuit for estimating the echo loss coefficients (ELC) for each spectral subband, wherein the spectral echo residual power at each subband is estimated based on the estimated ELCs. The detector may further comprise a circuit for estimating average power output of each subband prior to estimating the ELCs. The detector may further comprise a noise estimation circuit for estimating average noise power for the input signal from the output from the echo canceler in each subband prior to comparing. The noise estimation circuit may be a recursive circuit. The detector may further comprise a circuit for calculating an average estimate of background noise and subtracting this from the input signal from the output from the echo canceler to reduce sensitivity.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein.

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE DISCLOSED EMBODIMENTS

Figure 1:
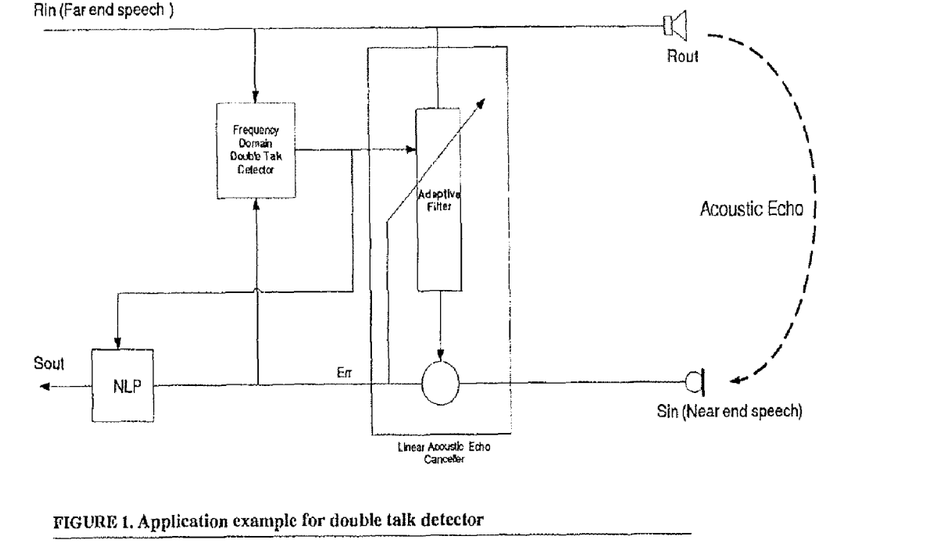
FIG. 1 is a block diagram broadly illustrating an application of a double talk detector in accordance with the teachings of this invention.

Referring to FIG. 1, there is illustrated an application of a double talk detector for acoustic echo cancellation in accordance with the teachings of this invention. As can be seen, the detector and method in accordance with the teachings of this invention can be used as an additional circuit between a linear echo canceler and a non-linear process device (NLP) to provide a more accurate detection of double talk. In a broad sense, there are two signals input into the detector. The signals are Err from a far-end talker and Rout from the output from an echo canceler. K spectral subbands are then created for each input signal. The spectral echo residual power is estimated at each subband and the estimated spectral echo residual and the output signal from the echo canceler for a selected subband are compared to a predetermined threshold. Based on this comparison, the detector determines whether double talk conditions exist.

Figure 2:
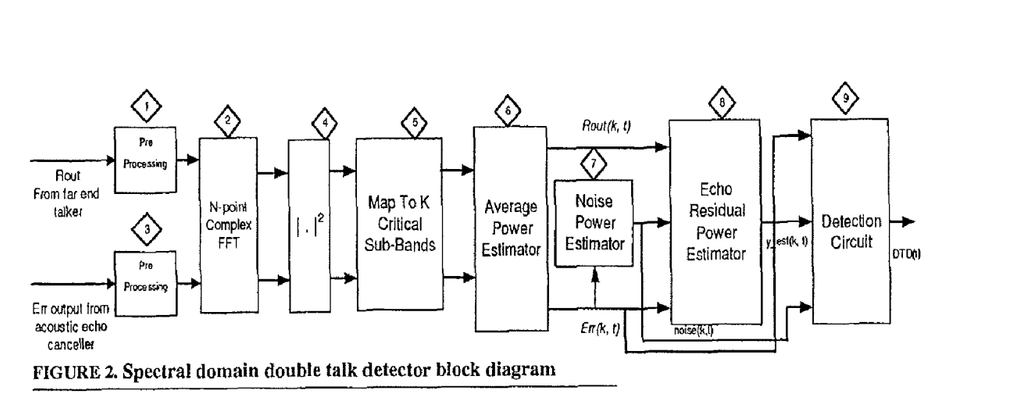
FIG. 2 is a block diagram illustrating a spectral domain double talk detector in accordance with the teachings of this invention.

FIG. 2 is a block diagram illustrating a preferred spectral domain double talk detector in accordance with the teachings of this invention. The input signals, Rout and Err, first are passed through two pre-processing steps 1 and 3, which both consist of a pre-emphasis filter, a framer and a windowing function. The pre-emphasis filter, is a first order FIR filter which will enhance higher frequency portion of the input signals. The framer forms overlapped frames of size M+L samples from each M-samples input data. For each data frame, the first L samples will be same as the last L samples from previous frame. For narrow band applications (sample rate=8 kHz), M=80 and L=24, while for wide band applications (sample_rate=16 kHz), M=160 and L=48. Windowing function (w(t)) is applied at the output of framer and is given by $$w(t) = \begin{cases} \sin\left(\pi \frac{(t+0.5)}{2L}\right)^2 & 0 \leq t < L \\ 1 & L \leq t < M \\ \sin\left(\pi \frac{(t-M+L+0.5)}{2L}\right)^2 & M \leq t < L+M \\ 0 & L+M \leq t < N \end{cases} \quad (EQ\ 1)$$

Output of the windowing function is zero padded to form N samples where N=128 for narrow band and N=256 for wide band applications.

After the preprocessing, K spectral subbands are created for each input signal in step 5. To create the spectral subbands, two N-point DFTs, one for each input data stream, are calculated in step 4. Since the input data are real valued signals, an N-point complex FFT can be used in step 2 to calculate both DFT's using the method described below.

First the following complex signal is formed by setting $$x = x1 + jx2 \quad (EQ\ 2)$$

where x1 and x2 are the preprocessed input signals (the outputs of blocks 1 and 3) and $j=\sqrt{-1}$. Next N-point DFT of x is calculated using an N-point complex FFT. DFT of each individual input x1 and x2 then are calculated from $$X1(n) = \frac{X_r(n) + X_r(-n)}{2} + j\frac{X_i(n) - X_i(-n)}{2} \quad (EQ\ 3)$$

$$X2(n) = \frac{X_i(n) + X_i(-n)}{2} - j\frac{X_r(n) - X_r(-n)}{2} \quad (EQ\ 4)$$

where $X1(n)$ and $X2(n)$ are DFTs of x1 and x2, $X_r(n)$ and $X_i(n)$ are real part and imaginary part of DFT of x and n=0, 1, ..., N-1.

Based on calculated DTFs for each input, K energy subbands are calculated in step 5 using following $$S1(k) = \frac{1}{f_h(k) - f_l(k)} \sum_{m=f_l(k)}^{f_h(k)} |X1(m)|^2 \quad k = 0, \ldots, K \quad (EQ\ 5)$$

$$S2(k) = \frac{1}{f_h(k) - f_l(k)} \sum_{m=f_l(k)}^{f_h(k)} |X2(m)|^2 \quad k = 0, \ldots, K \quad (EQ\ 6)$$

where $f_h(k)$ and $f_l(k)$ are set based on uniformly or critically spaced subbands (see Table 1 for an example of critically spaced subbands).

In FIG. 2, number of FFT points and number of subbands can vary depending on trade-off between optimum detection versus computational complexity and memory requirements. Preferably, K is a number much less than number of FFT points.

TABLE 1

Example of Subbands Frequency Mapping

| k | $f_h(k)$ | $f_l(k)$ |
|---|---|---|
| 0 | 1 | 0 |
| 1 | 3 | 2 |

TABLE 1-continued

Example of Subbands Frequency Mapping

| k | $f_h(k)$ | $f_l(k)$ |
|---|---|---|
| 2 | 5 | 4 |
| 3 | 7 | 6 |
| 4 | 9 | 8 |
| 5 | 11 | 10 |
| 6 | 13 | 12 |
| 7 | 16 | 14 |
| 8 | 19 | 17 |
| 9 | 22 | 20 |
| 10 | 26 | 23 |
| 11 | 30 | 27 |
| 12 | 35 | 31 |
| 13 | 41 | 36 |
| 14 | 48 | 42 |
| 15 | 55 | 49 |
| 16 | 63 | 56 |
| 17 | 72 | 64 |
| 18 | 83 | 73 |
| 19 | 95 | 84 |
| 20 | 110 | 96 |
| 21 | 127 | 111 |

In step 6, the average power of output of each subband is estimated using the recursive equation $$\text{Err}(k, t) = \alpha \text{Err}(k, t-1) + (1-\alpha)S2(k, t) \quad (EQ\ 7)$$

$$\text{Rout}(k, t) = \alpha \text{Rout}(k, t-1) + (1-\alpha)S1(k, t) \quad (EQ\ 8)$$

where $0 \leq \alpha < 1$, k is index to subband number and t is index to data frame number.

Step 7 estimates average noise power for Err input at each subband. To estimate the noise power, a circuit shown in FIG. 3 can be used. As can be seen from FIG. 3, a recursive circuit is used to update average noise power. Update of noise power is controlled by a noise activity detector 18 at Err input and a signal activity detector 17 at Rout input. Noise activity detector 18 detects those data frames where only noise is present and speech power is negligible. Signal activity detector 17 is used to make sure that echo residual will be not detected as noise.

Figure 3:
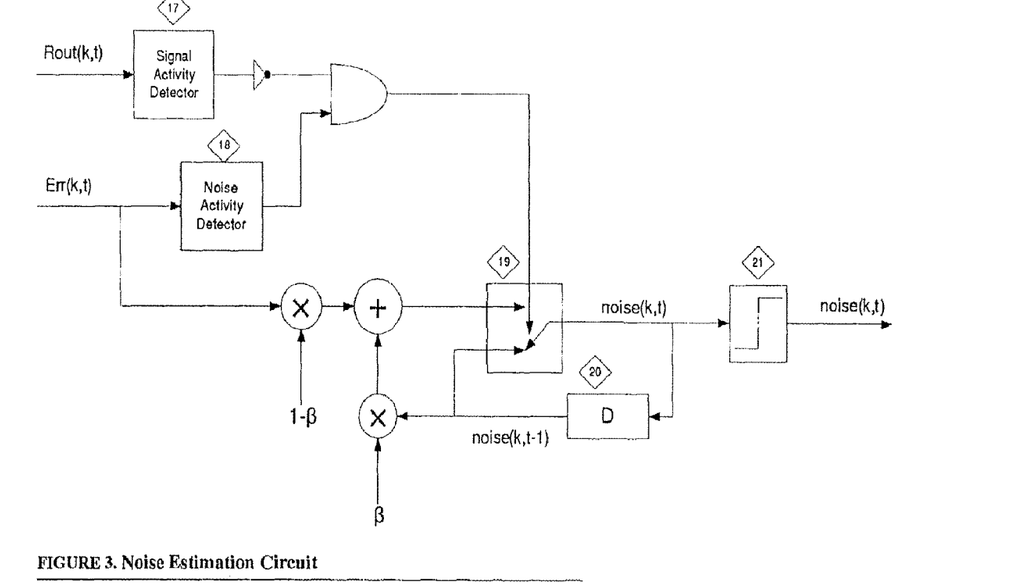
FIG. 3 is a block diagram of one embodiment of a noise activity detector that can be used in the detector of FIG. 2.

Updating unit 19 controls the recursive update for noise estimate. The noise power estimate is only updated when there is no signal activity at Rout but noise activity has been detected at Err input.

In FIG. 2, step 8 estimates echo residual power spectrum. For each subband echo residual power is calculated using the circuit shown in FIG. 4. Part of this circuit adaptively calculates the echo loss coefficients (ELC) (C(k,t)) for Rout and Err inputs for each subband k and data frame t.

Figure 4:
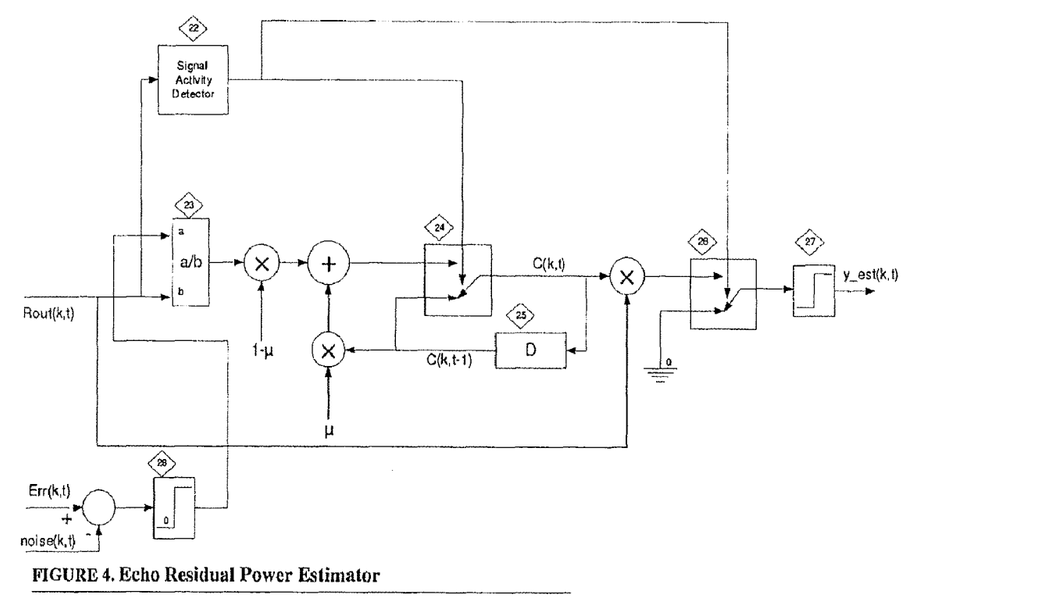
FIG. 4 is a block diagram of one embodiment of a echo residual spectral power estimator that can be used in the detector of FIG. 2.

The control circuit comprises signal activity detector 22 and unit 24 to stop updating C(k, t) when there is no active signal at Rout input. The ELC will be used to estimate the spectral echo residual power at each subband. The echo loss coefficients C(k, t) multiplied by Rout input give an estimate of echo residual spectrum y_est(k, t). This estimate will be set to zero, through unit 26, when there is no signal activity at Rout input.

In FIG. 2, step 9 is used to detect double talk conditions based on the spectral differences between Err signal, generated by output of acoustic echo canceler, and y_est signal generated using the circuit shown in FIG. 4. No matter how high the time domain echo residual, there will be some frequency bands that echo residual power is very small while the near-end signal power is significant. This can be used to detect the double talk condition as explained below.

These frequency bands can be well predicted based on inherent frequency response differences between the transducers (speakers and microphones) of the hands free device and can be programmed into the proposed double talk detector circuit. Note that in hands free devices microphones and speakers usually have different frequency responses. For example small speakers used in speaker phone devices can not reproduce low frequency portion of the far-end signal while the microphone (which picks up the near-end talker's signal) have better low frequency response. This means that during double talk periods the low frequency band signal energy of near-end signal should be much higher than the one of far-end echo signal and this can be used to detect double talk condition.

Also the acoustical properties of the hands free device and location of microphone and speaker can affect the spectrum of the returned echo resulting is less echo in certain frequency bands. This knowledge can also be used to the double talk condition.

Figure 6:
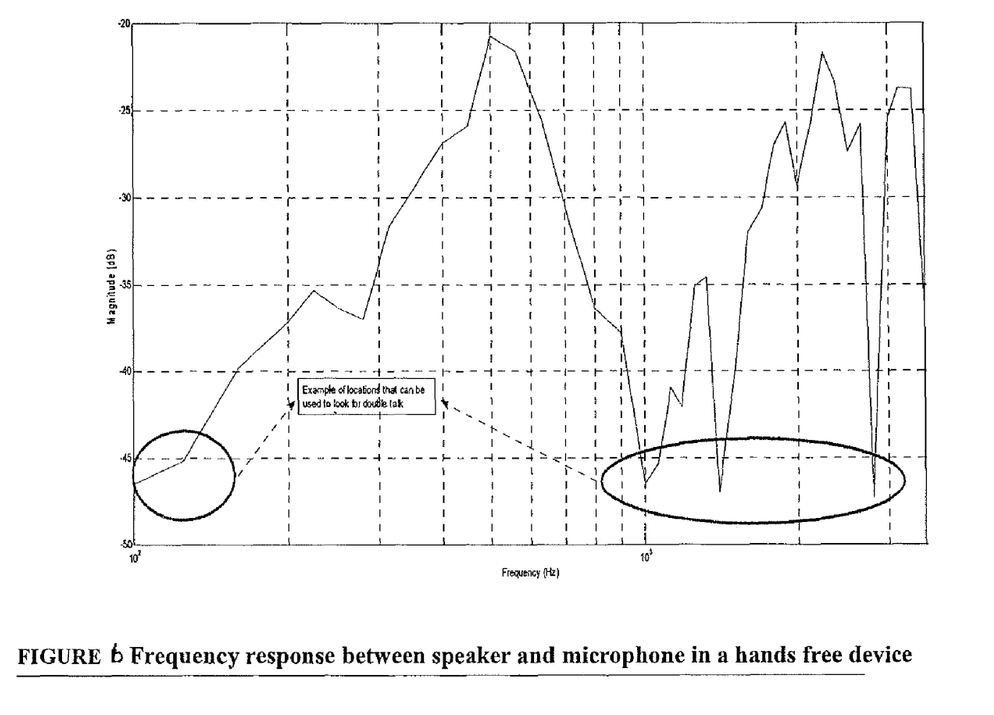
FIG. 6 shows an example of frequency response between a speaker and microphone in a hands free device.

For example, FIG. 6 shows an example of frequency response between a speaker and microphone in a hands free device. Note that this frequency response also includes the effect of acoustic path between the microphone and speaker. As is marked in the figure with circles, there are nulls in the frequency response and the location of these nulls can be anywhere in the frequency spectrum. Note that the location of these nulls depends on the electroacoustic properties of speaker and acoustic properties of the medium between speaker and microphone (the microphone itself usually has a flat spectrum). These nulls can be exploited to predict the presents of a double talk signal. Note that because of these nulls the far end signal which passes through the speaker, acoustic path and the microphone will be attenuated for the frequency bands around the null and as a result, a less echo residual is expected in these frequency bands. At the same time near-end signal which only passes through the microphone will be less affected by these nulls and so by comparing the calculated power at these frequency bands with estimated echo power presence of double talk can be detected.

Figure 5:
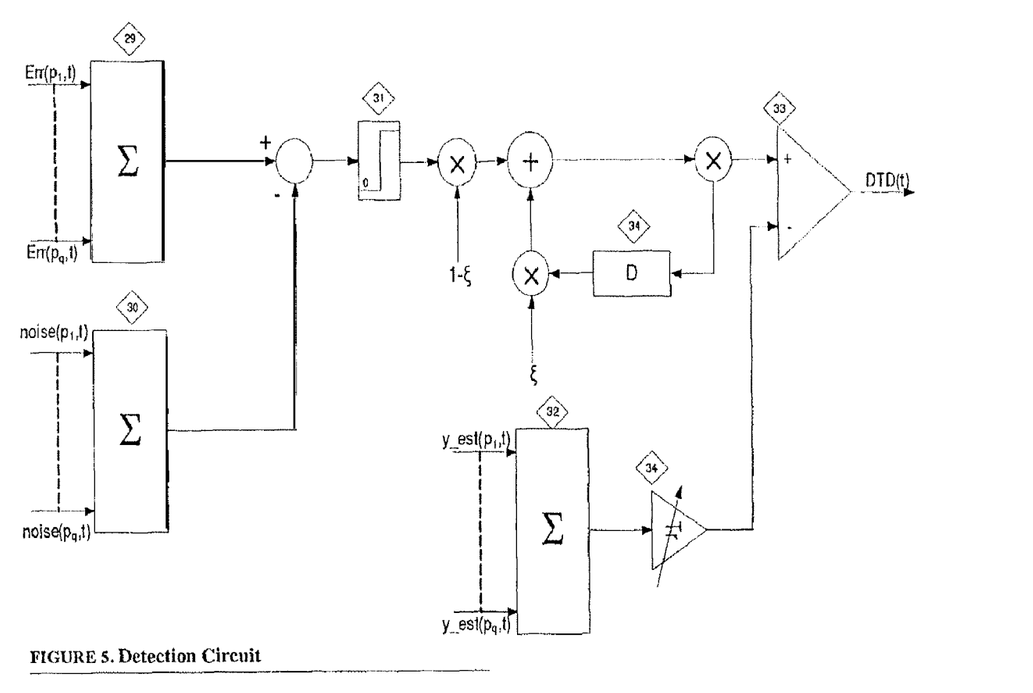
FIG. 5 is a block diagram of one embodiment of a detection circuit that can be used in the detector of FIG. 2.

FIG. 5 is one embodiment of a circuit for frequency domain double talk detector. Summation units 29, 30 and 32 calculate the total energy in selected frequency bands $P_1, \ldots, P_q$ for each of the input signals Err, noise and y_est.

$P_1, \ldots, P_q$ are selected automatically (as described below) or manually based on the known spectral differences between the far end talker echo and the near end talker signal. For example for some speaker phone device $P_1, \ldots, P_q$ can be set to the lower frequency bands (bands 1 to 3) or other frequency bands that they are known to be different between the microphone and speaker.

To reduce sensitivity of double talk detector to back ground noise, summation unit 30 calculates an average estimate of the background noise which then is subtracted from Err signal. Comparator 33 compares the average energy of Err input with estimated value of echo (calculated based on the circuit in FIG. 4). Controller 34 controls the sensitivity of double talk detector.

In FIG. 5, a circuit can be added which automatically finds the set of frequency bands where echo power is much less than the near end signal power. In double talk detection method in accordance with the teachings of the present invention, subbands (P1 to Pq) are selected based on the location of the nulls. The find the location of the nulls one of the following two methods can be used:

1) By comparing the echo loss coefficients (ELC) with each other and selecting the sub-bands that have maximum ELCs. Note that the higher the ELC value for a subband higher echo attenuation for that subband which is the indication of a null for that subband. In general, more than about 30 dB will be considered high echo attenuation.

2) By passing a white noise or a sweep sinosoidal signal through the speaker (when no near end signal is presents) and measuring power of echo residual for each subband. The subbands with lowest echo residual corresponds to a null.

Note that each of above methods can automatically find the location of the null. The advantage of method (1) is that selection of subbands can be done on-line while device is operating under its normal use. The advantage of method (2) is that it will give more accurate results in selecting the subbands but it requires an off-line operation.

Numerous modifications may be made without departing from the spirit and scope of the invention as defined in the appended claims.

What is claimed is:

1. A method of detecting double talk conditions in a hands free communication system, the method comprising:
   receiving an input signal from a far-end transducer and an input signal from the output from an echo canceller;
   converting the input signals to a frequency domain using N-point FFT blocks;
   creating K spectral subbands from output of FFT blocks;
   selecting q spectral subbands for each converted input signal based on inherent frequency differences between the far-end transducer and a near-end transducer; and
   determining whether double talk conditions exist based on a comparison of the estimated echo power from far-end transducer to average power output of echo canceller for selected q subbands.

2. The method of claim 1 wherein the step of determining double talk comprises:
   estimating the spectral echo power for selected subbands for the input signal from the far-end transducer;
   estimating average power output for selected subband for the input signal from the output of the echo canceller; and
   comparing the spectral echo power and the average power output to a predetermined threshold.

3. The method of claim 2, further comprising estimating the echo loss coefficients (ELC) for each spectral subband, wherein the spectral echo power at each subband is estimated based on the estimated ELCs.

4. The method of claim 1, wherein the ELCs are estimated using a recursive method.

5. The method of claim 4, wherein K is less than N.

6. The method of claim 1, further comprising the step of estimating average power output of each subband prior to the step of estimating the ELCs.

7. The method of claim 6, wherein the step of estimating average power output of each subband is done using a recursive method.

8. The method of claim 1, further comprising the step of estimating average noise power for the input signal from the output from the echo canceller in each subband prior to the comparing step.

9. The method of claim 8, wherein the step of estimating average noise power for the input signal from the output from the echo canceller in each subband is done using a recursive method.

10. The method of claim 9, further comprising the step of calculating an average estimate of background noise and subtracting this from the input signal from the output from the echo canceller to reduce sensitivity.

11. The method of claim 1, further comprising the step of automatically finding subbands where echo power is less than a near-end signal power.

12. A double talk detector, comprising: a circuit to detect inherent frequency differences between a far-end transducer and a near-end transducer in a hands free communication system; a circuit to detect acoustical effect on the spectrum of the returned echo signal; and a circuit to compare the inherent frequency differences and acoustical effect to detect double talk conditions.

13. The detector of claim 12, comprising:
an input for receiving an input signal from a far-end transducer and an input signal from the output from an echo canceller;
a FFT filter for converting the input signals to a frequency domain using N-point complex FFT blocks;
a sub bander unit for creating K spectral subbands for each input signal;
a circuit for selecting q subbands based on inherent spectral acoustic differences between the far-end transducer and a near-end transducer;
an estimator for estimating the spectral echo power for selected subbands for the input signal from the far-end transducer;
an estimator for estimating average power output for selected subbands for the input signal from the output of the echo canceller;
a comparator for comparing the spectral echo power and the average power output to a predetermined threshold; and
a circuit for determining whether double talk conditions exist based on the comparison.

14. The detector of claim 13, wherein the circuit for estimating the spectral echo residual power at each subband comprises a circuit for estimating the echo loss coefficients (ELC) for each spectral subband, wherein the spectral echo residual power at each subband is estimated based on the estimated ELCs.

15. The detector of claim 14, further comprising a circuit for estimating average power output of each subband prior to estimating the ELCs.

16. The detector of claim 15, wherein the method of estimating average power output of each subband is a recursive circuit.

17. The detector of claim 16, further comprising a noise estimation circuit for estimating average noise power for the input signal from the output from the echo canceller in each subband prior to comparing.

18. The detector of claim 17, wherein the noise estimation circuit is a recursive circuit.

19. The detector of claim 18, further comprising a circuit for calculating an average estimate of background noise and subtracting this from the input signal from the output from the echo canceller to reduce sensitivity.

20. The detector of claim 19, further comprising a circuit for automatically finding frequency bands where echo power is less than a near-end signal power.

21. The detector of claim 14, wherein the circuit for estimating the echo loss coefficients (ELC) for each spectral subband and the circuit for estimating the spectral echo residual power at each subband based on each ELC are combined into a single circuit.

22. A method of detecting double talk conditions in a hands free communication system, the method comprising: detecting inherent frequency differences between a far-end transducer and a near-end transducer in a hands free communication system; detecting acoustical effect on the spectrum of the returned echo signal; and comparing the inherent frequency differences and acoustical effect to detect double talk conditions.

* * * * *